United States Patent
Lee et al.

(10) Patent No.: US 11,185,772 B2
(45) Date of Patent: *Nov. 30, 2021

(54) DISPLAY DEVICE AND METHOD OF CHANGING SETTINGS OF DISPLAY DEVICE

(71) Applicant: SAMSUNG ELECTRONICS CO., LTD., Suwon-si (KR)

(72) Inventors: Hyeon-ji Lee, Seoul (KR); Dong-hyun Kim, Seoul (KR); Yu-hyeon Jun, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 33 days.

This patent is subject to a terminal disclaimer.

(21) Appl. No.: 16/502,967

(22) Filed: Jul. 3, 2019

(65) Prior Publication Data
US 2019/0344176 A1 Nov. 14, 2019

Related U.S. Application Data

(63) Continuation of application No. 15/340,046, filed on Nov. 1, 2016, now Pat. No. 10,376,786.

(30) Foreign Application Priority Data

Dec. 24, 2015 (KR) .................. 10-2015-0186779

(51) Int. Cl.
*A63F 9/24* (2006.01)
*A63F 13/00* (2014.01)
(Continued)

(52) U.S. Cl.
CPC .............. *A63F 13/52* (2014.09); *A63F 13/20* (2014.09); *A63F 13/95* (2014.09); *G06F 1/1601* (2013.01);
(Continued)

(58) Field of Classification Search
CPC .............................. A63F 13/52; A63F 13/533
See application file for complete search history.

(56) References Cited

U.S. PATENT DOCUMENTS

| 7,392,470 B2* | 6/2008 | Kammler | .............. G07F 17/323 |
| | | | 715/234 |
| 7,808,554 B2* | 10/2010 | Soneira | .................. H04N 17/04 |
| | | | 348/460 |

(Continued)

FOREIGN PATENT DOCUMENTS

| JP | 4274547 B2 | 3/2009 |
| KR | 10-2007-0025296 A | 3/2007 |
| KR | 10-0727154 B1 | 6/2007 |

OTHER PUBLICATIONS

Anonymous, "Tamhadaa D-SLR. Samsung WB5000", Nov. 9, 2009, Chosun Product Reviews, English 94 pages total, http://review.chosun.com/site/data/html_dir/2009/11/09/2009110900987.html.

*Primary Examiner* — Milap Shah
*Assistant Examiner* — Jason Pinheiro
(74) *Attorney, Agent, or Firm* — Sughrue Mion, PLLC

(57) ABSTRACT

Provided are a display device and method of changing a display setting. According to an aspect of an exemplary embodiment, the method of changing a display setting in a display device includes operations of: storing a plurality of display settings corresponding to a plurality of game categories; determining a display setting to be used for displaying video data of a currently running game among the plurality of display settings; and changing an actual display setting of the display device according to a determined display setting.

20 Claims, 12 Drawing Sheets

(51) Int. Cl.
*G06F 17/00* (2019.01)
*A63F 13/52* (2014.01)
*G06F 3/0489* (2013.01)
*G06F 1/16* (2006.01)
*H04N 21/422* (2011.01)
*A63F 13/20* (2014.01)
*A63F 13/95* (2014.01)
*G06F 3/02* (2006.01)
*G06F 3/0482* (2013.01)
*A63F 13/53* (2014.01)
*G06F 3/0481* (2013.01)
*G06F 3/0488* (2013.01)

(52) U.S. Cl.
CPC ............ *G06F 1/1605* (2013.01); *G06F 3/02* (2013.01); *G06F 3/0482* (2013.01); *G06F 3/04897* (2013.01); *H04N 21/42204* (2013.01); *A63F 13/53* (2014.09); *G06F 3/04817* (2013.01); *G06F 3/04883* (2013.01)

(56) References Cited

U.S. PATENT DOCUMENTS

| | | | |
|---|---|---|---|
| 8,376,853 B2* | 2/2013 | Dagman | A63F 13/2145 463/37 |
| 8,674,921 B2* | 3/2014 | Lin | G09G 5/006 345/94 |
| 8,958,015 B2* | 2/2015 | Ozawa | H04N 17/004 348/603 |
| 9,104,238 B2* | 8/2015 | Walley | G06F 3/0346 |
| 9,842,530 B2* | 12/2017 | Carlsson | G09G 3/36 |
| 2008/0043031 A1* | 2/2008 | Jagmag | G06F 3/04897 345/581 |
| 2015/0199810 A1 | 7/2015 | Lee et al. | |

* cited by examiner

DISPLAY DEVICE AND METHOD OF CHANGING SETTINGS OF DISPLAY DEVICE

CROSS-REFERENCE TO RELATED APPLICATION

This application is a continuation application of application Ser. No. 15/340,046, filed on Nov. 1, 2016, which claims priority from Korean Patent Application No. 10-2015-0186779, filed on Dec. 24, 2015, in the Korean Intellectual Property Office, the disclosures of which are incorporated herein by reference in their entireties.

BACKGROUND

1. Field

Apparatuses and methods consistent with exemplary embodiments relate to changing settings of a display device and, more particularly, to changing display settings to be used for displaying video data on a display device. Additionally, a display device consistent with exemplary embodiments that may be suitable for implementing the methods of changing the display settings.

2. Description of the Related Art

Due to the developments of multimedia technologies and video signal processing technologies, it has become possible to process and provide various contents through a display device. In particular, due to the development of graphic techniques used for running computer games, a display device is more than a simple video output device and has a significant influence over the gaming experience nowadays.

Optimum values of display settings such as brightness, input lag, and black equalizer may differ depending on contents being executed. However, a user, who wishes to change or check the display settings, has to manipulate the display device manually through menus and sub-menus provided by the display device.

Thus, a technology that allows the user to change the display settings effectively and to check the changed settings easily is desired.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display device and a method of changing display settings, in which a display setting to be used for displaying video data of a currently running game may be determined and changed effectively by storing display settings corresponding to each of a plurality of game categories.

According to an aspect of an exemplary embodiment, the display setting of a display device may be easily changed by using a plurality of buttons.

According to an aspect of an exemplary embodiment, the display setting may be effectively changed according to a category of a game that is currently running on the display device, even when there is no user input.

Additional aspects will be set forth in part in the following description and, in part, will be apparent from the description, or may be learned by practice of the exemplary embodiments.

According to an aspect of an exemplary embodiment, the method of changing a display setting in a display device includes operations of: storing a plurality of display settings corresponding to a plurality of game categories; determining a display setting to be used for displaying video data of a currently running game among the plurality of display settings; and changing an actual display setting of the display device according to the determined display setting.

The operation of storing the plurality of display settings may include matching each of the plurality of display settings to respective one of a plurality of buttons of the display device.

The operation of determining the display setting may include: receiving a user input selecting one of the plurality of buttons; and determining a display setting matched with the selected button as the display setting to be used for the video data.

The method of changing the display setting may further include operations of: receiving a user input selecting one of the plurality of buttons; and displaying a first graphical user interface (GUI) representing a display setting matched with the selected button.

The method of changing the display setting may further include an operation of displaying a second GUI allowing a user to edit the display setting matched with the selected button.

The display setting may include at least one of: black equalizer, response time, refresh rate, free sync, and input lag.

The method of changing the display setting may further include an operation of storing a game list representing at least one of the plurality of game categories and at least one game identifier corresponding to the at least one of the plurality of game categories. In such an exemplary embodiment, the operation of determining the display setting may include operations of: determining a category of the currently running game among the plurality of game categories based on the game list; and determining a display setting corresponding to the determined category of the game as the display setting to be used for displaying the video data.

The method of changing the display setting may further include an operation of recommending at least one of the plurality of display settings based on a display settings history representing display settings previously used in the display device.

According to an aspect of another exemplary embodiment, the display device includes: a memory configured to store a plurality of display settings corresponding to a plurality of game categories; and a processor configured to determine a display setting to be used for displaying video data of a currently running game among the plurality of display settings, and to change an actual display setting of the display device according to a determined display setting.

The display device may further include a user input unit comprising a plurality of buttons. The processor may be configured to match each of the plurality of display settings to respective one of the plurality of buttons of the display device.

The processor may receive a user input selecting one of the plurality of buttons, and determine a display setting matched with the selected button as the display setting to be used for the video data.

The display device may further include a display configured to display a first GUI representing a display setting matched with a selected button. The selected button may be selected among the plurality of buttons based on a user input.

The display may be configured to display a second GUI allowing a user to edit the display setting matched with the selected button.

The display setting may include at least one of: black equalizer, response time, refresh rate, free sync, and input lag.

The memory may store a game list representing at least one of the plurality of game categories and at least one game identifier corresponding to the at least one of the plurality of game categories. The processor may be configured to determine a category of the currently running game based on the game list, and to determine a display setting corresponding to a determined category of the game as the display setting to be used for displaying the video data.

The processor may be configured to recommend at least one of the plurality of display settings based on a display settings history representing display settings previously used in the display device.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
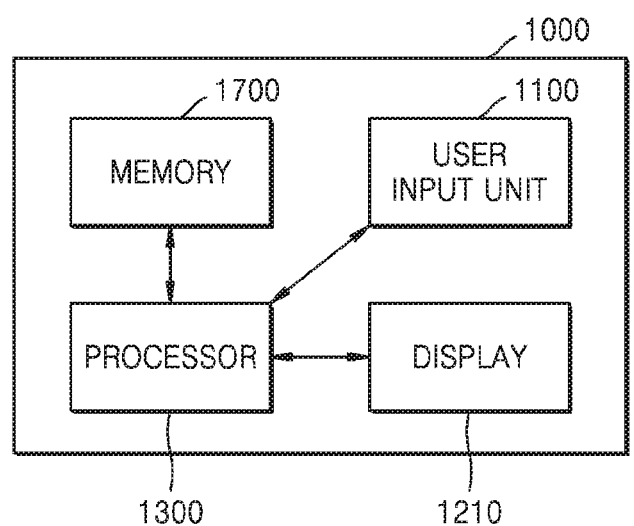
FIG. 1 is a block diagram of a display device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list.

The terminologies including ordinals such as "first" and "second" used to explain various elements in this specification may be used to discriminate an element from the other ones or for simplicity.

The terminologies are used just for describing exemplary embodiments, and are not intended to limit the present exemplary embodiments. Expressions of the number of subjects or objects in this specification are not intended to limit the scope of the disclosure, and the expressions using a singular form include a case of using plural elements unless the context definitely limits to a case of using a single element. It will be understood that when an element is referred to as being "connected to" another element, it can be "directly connected to" the other element or "electrically connected to" the other element. The terms "comprises" and/or "comprising" or "includes" and/or "including" or "contains" and/or "containing", when used in this specification, specify the presence of the stated elements, but do not preclude the presence or addition of one or more other elements.

In this specification, especially the claims, the definite article "the," demonstrative pronouns, and the other demonstrative terminologies may designate singular or plural objects. Sequences of the operations may be changed as required. Also, components such as a system, a device, a structure, and a circuit may be combined or aggregated with other components or replaced by other components or equivalents thereof without significant changes in result.

The expressions "some exemplary embodiments" or "an exemplary embodiment" does not necessarily refer to a common embodiment.

The exemplary embodiments may be described in terms of functional blocks and various operations. The functional blocks may be implemented using hardware and/or software components. For example, the exemplary embodiments may employ tangible circuits including a processor and a memory. The exemplary embodiments may include various algorithms implemented by combinations of data structure, process, routines, and program components, and may be written in programming languages or scripting languages. Functional aspects or operations may be implemented by algorithms that may be executed in one or more processors. Also, the exemplary embodiments may employ general-purpose technologies for electronic environment settings, signal processing, and/or data processing. Terminologies such as "unit," "element," and "means" are used in broad sense, and are not intended to limit mechanical or physical configuration.

Connections or interconnections between components in the drawings represent schematically and exemplarily functional connections and/or physical or circuit connections, and may be replaced by or incorporated with additional functional connections and/or physical or circuit connections.

In this disclosure, display settings may represent attributes of a display device 1000 used for outputting video data by the display device 1000. Items of the display settings may include at least one of: black equalizer, response time, refresh rate, free sync, and input lag.

In this disclosure, a category of a game refers to a genre of a video game, and may include a role-playing game (RPG), a real-time strategy (RTS) game, and a first-person shooter (FPS) game, but is not limited thereto.

In this disclosure, a game list may represent a list in which game identifiers such as a name, icon, and image of each of the games are arranged.

In this disclosure, a button may be included in a user input unit of the display device 1000. The button may be implemented by a hardware configuration in the display device 1000, but is not limited thereto and may be implemented by a software button in the display device 1000.

In this disclosure, a display setting history may represent a record of the display settings which have been set by the user while using the display device 1000. The display setting history may include display settings recently used by the user and display settings frequently used by the user.

In this disclosure, the video data may be data which the display device 1000 outputs through a display.

Hereinbelow, the disclosure is described in detail with reference to the attached drawings.

Figure 2:
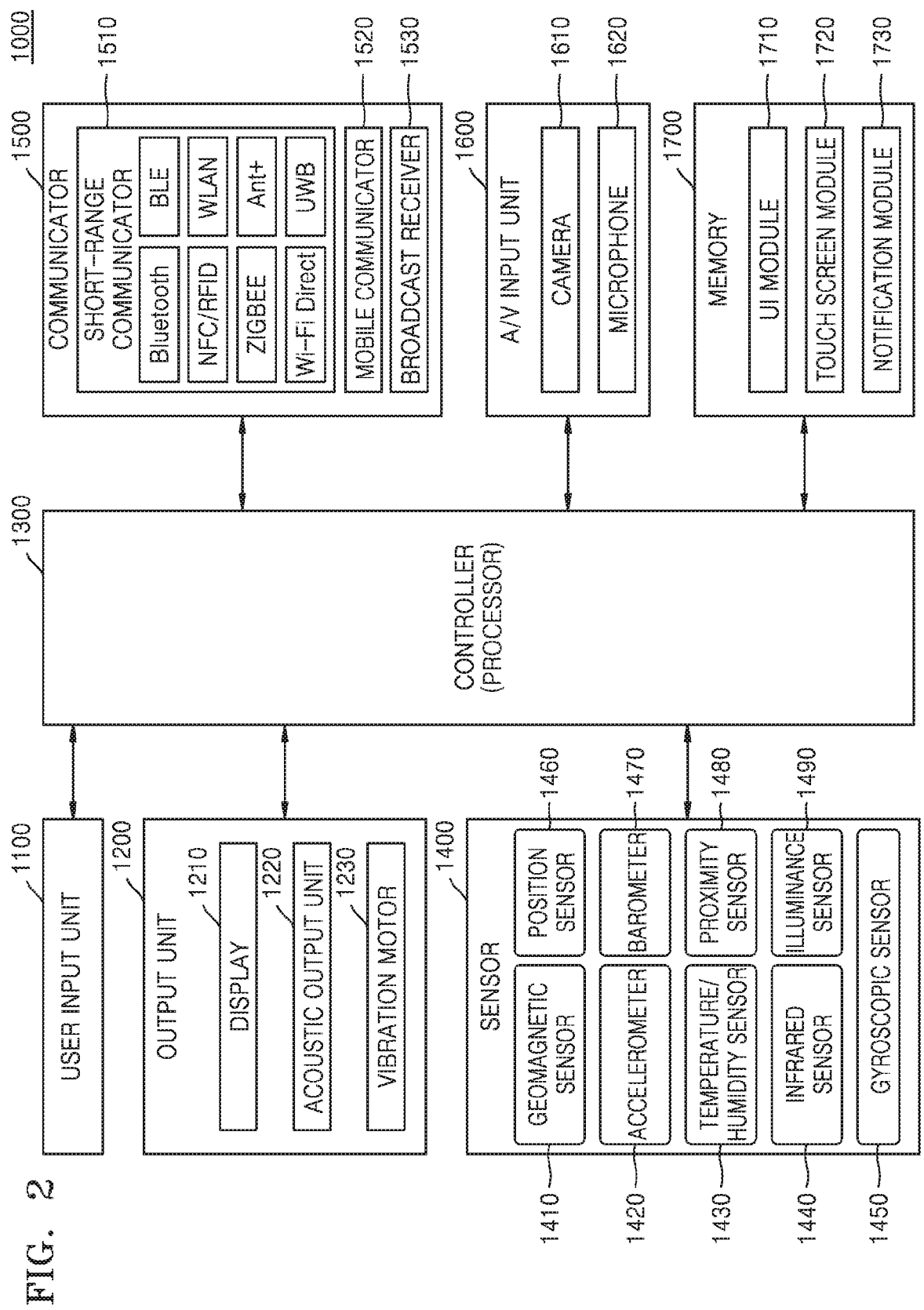
FIG. 2 is a detailed block diagram of a display device according to an exemplary embodiment.

FIGS. 1 and 2 are block diagrams of a display device 1000 according to an exemplary embodiment.

As shown in FIG. 1, the display device 1000 according to an exemplary embodiment may include a memory 1700, a processor 1300, a display 1210, and a user input unit 1100. The components shown in FIG. 1 should not be regarded as essential to the display device 1000. Instead, the display device 1000 may include more elements than those shown in FIG. 1, or fewer elements than those shown in FIG. 1.

For example, as shown in FIG. 2, the display device 1000 according to an exemplary embodiment may further include a sensor 1400, an audio/video (A/V) input unit 1600, and a communicator 1500, in addition to the memory 1700, the processor 1300, the display 1210, and the user input unit 1100.

The memory 1700 may store display settings corresponding to a plurality of game categories. The memory 1700 may store the display settings corresponding to respective game categories in response to respective button inputs. When the user presses one of the buttons in a prescribed manner, e.g., by touching and holding the button or double tapping the button, the display device 1000 may store the display setting corresponding to the pressed button as an active display setting. Also, the display device 1000 may store the display setting corresponding to each button in response to a user input applied through a graphical user interface (GUI) or a menu.

The memory 1700 may store a display setting history for the settings which have been set by a user while using the display device 1000. The memory 1700 may further store a game list that may be used for determining a category of a game currently running by using the processor 1300.

The memory 1700 may include a flash memory, a hard disk, a multimedia card micro, a card-type memory such as an SD or XD memory, RAM, ROM, EEPROM, PROM, a magnetic memory, a magnetic disc, and an optical disk, but is not limited thereto.

The programs stored in the memory 1700 may be categorized into a plurality of modules, according to their functions, such as a User Interface (UI) module 1710, a touch screen module 1720, and a notification module 1730, for example.

The UI module 1710 may provide a user interface or GUI that is specialized for each application and interacts with the display device 1000. The touch screen module 1720 senses touch gestures of the user on a touch screen, and may transfer touch gesture information to the processor 1300. The touch screen module 1720 according to some exemplary embodiments may recognize and analyze touch codes. The touch screen module 1720 may be configured as a separate hardware including the processor 1300.

Various sensors may be provided in or near the touch screen to sense a touch or a hovering of the touch screen. One example of a sensor for sensing the touch of the touch screen may be a tactile sensor. The tactile sensor refers to a sensor that detects the stimulus of a contact on a specific object by human sensitivity or higher. The tactile sensor may detect various information such as the roughness of a touched surface, the hardness of a touching body, and the temperature of a touched location.

Another example of a sensor for sensing the touch of the touch screen may be a proximity sensor. The proximity sensor refers to a sensor that detects the presence of an object approaching a detection surface or a nearby object by use of electromagnetic field intensity or infrared ray without physical contact. Examples of the proximity sensor include a through-beam photoelectric sensor, a diffuse-reflective photoelectric sensor, a retro-reflective photoelectric sensor, a high frequency oscillation proximity sensor, a capacitance proximity sensor, a magnetic proximity sensor, and an infrared proximity sensor. The touch gestures of the user may include 'tap', 'double tap', 'touch and hold', 'drag item', 'slide finger', 'flick finger', 'drag and drop item', and 'swipe'.

The notification module 1730 may generate a signal for notifying an event happened in the display device 1000. The events happening in the display device 1000 include receiving a call, receiving a message, a key input entry, and a schedule notification. The notification module 1730 may output notifications in a video form through the display 1210, in an audio form through an acoustic output unit 1220, or as vibrations through a vibration motor 1230.

The processor 1300 may control an overall operation of the display device 1000. For example, the processor 1300 may control the functional blocks of the display device 1000 such as the user input unit 1100, an output unit 1200, the sensor 1400, the communicator 1500, and the A/V input unit 1600 by executing programs stored in the memory 1700.

The processor 1300 may determine a display setting, to be used for displaying video data of the currently running game, among display settings stored in the memory 1700.

The processor 1300 may determine the display setting to be used for displaying video data of the currently running game in response to a user input. The display device 1000 may include one or more buttons for receiving user input, and the processor 1300 may determine the display setting corresponding to a specific button input of the user. The processor 1300 may change the display setting being used for displaying video data with a determined display setting.

Also, the processor 1300 may determine the display setting, even when there is no user input, by determining the category of the currently running game. The processor 1300 may search for an identification value of the currently running game from the game list stored in the memory 1700. The processor 1300 may determine the category of the currently running game based on the search result. The processor 1300 may select one of the display settings stored in the memory 1700 that corresponds to the category of the game. The processor 1300 may change the display setting in use for displaying video data with the selected display setting.

The processor 1300 may control the display 1210 to display a first GUI showing a current display setting. The processor 1300 may control the display 1210 to display the first GUI in response to a user input. The user input may be applied through the button included in the user interface unit 1100, but is not limited thereto. The user may check the current display setting through the first GUI and change the display setting by using the first GUI.

The processor 1300 may control the display 1210 to display a second GUI that enables the user to store or edit the display setting. The processor 1300 may control the display 1210 to display the second GUI in response to a user input. The user input may be applied through the button included in the user interface unit 1100, but is not limited thereto. The user may store the display settings corresponding to respective buttons through the second GUI.

The processor 1300 may control the memory 1700 to store the display setting recently used by the user while the user plays a game of a particular category or the display setting frequently used by the user while the user plays the game of the category. The processor 1300 may control the display 1210 to output a display setting history. The display device 1000 may recommend a display setting preferred by other users while playing a game of a particular category by outputting the display setting history.

The output unit 1200 may output an audio signal, a video signal, or a vibration signal. The output unit 1200 may include the display 1210, the acoustic output unit 1220, and the vibration motor 1230.

The display 1210 outputs information processed by the display device 1000.

The display 1210 may display video data of the currently running game. The game may be executed by an external device connected to the display device 1000. Also, the display 1210 may show the display setting currently in use. The display 1210 may display the display setting currently in use in response to the user input. The display 1210 may output the first GUI in a manner that allows the user to check a plurality of settings at a time without having to go through sub-menus of various steps.

The display 1210 may output the second GUI that allows the user to store the display setting corresponding to a game category through a respective button. The display 1210 may output the second GUI in response to the user input through the user input unit 1100. The user may store a plurality of display settings at a time through the second GUI without having to go through sub-menus of various steps.

Also, the display 1210 may display the display setting history of the user. The display 1210 may output the display setting history of the user through a GUI. Using the display setting history output by the display 1210, the user may easily and quickly store the display setting preferred by the user while playing a particular game.

The acoustic output unit 1220 outputs audio data received from the communicator 1500 or stored in a memory 1700.

The acoustic output unit 1220 outputs acoustic sound related with operations performed by the display device 1000 such as ringtones, message ringtones, and notification sounds. The acoustic output unit 1220 may include a speaker and a buzzer.

The vibration motor 1230 may generate vibrations. For example, the vibration motor 1230 may output vibrations corresponding to video outputs or audio outputs such as the ringtone and the message ringtone. Also, the vibration motor 1230 may output vibrations when a touch input is applied to a touch screen.

The user input unit 1100 receives user inputs to the display device 1000. The user input unit 1100 may receive the user inputs directed to storing of the display settings, and to the first and second GUIs. The user input unit 1100 may include one or more buttons but is not limited thereto.

The sensor 1400 may detect the state of the display device 1000 or the condition around the display device 1000, and provide the detected information to the processor 1300. The sensor 1400 may include a geomagnetic sensor 1410, an accelerometer 1420, a temperature/humidity sensor 1430, an infrared sensor 1440, a gyroscopic sensor 1450, a position sensor 1460 such as a global positioning system (GPS) sensor, a barometer 1470, a proximity sensor 1480, and an illuminance sensor 1490, but is not limited thereto. Each of the sensors will not be described in detail because the function of each sensor is readily deductible intuitively from the name of the sensor.

The communicator 1500 may include at least one element for performing communication between the display device 1000 and the external device. The communicator 1500 may receive broadcast data from the external device or a server. For example, the communicator 1500 may include a short-range wireless communicator 1510, a mobile communicator 1520, and a broadcast receiver 1530, but is not limited thereto.

The short-range wireless communicator 1510 may include, but is not limited to, a Bluetooth communicator, a BLE communicator, a wireless LAN communicator, an NFC unit, an Ant+ communicator, a ZigBee communicator, an IrDA communicator, a WiFi communicator, WFD communicator, and an UWB communicator.

The mobile communicator 1520 transmits and receives wireless signals to and from at least one of: a base station of a mobile communication network, an external terminal, and the server. The wireless signals may include various kinds of data related with transmission and receipt of voice call signals, video call signals, text messages, or multimedia messages.

The broadcast receiver 1530 receives broadcast signals and/or broadcast related information through broadcast channels. The broadcast channels may include satellite broadcast channels and terrestrial broadcast channels. The broadcast receiver 1530 may not be included in the display device 1000 depending on the implementation of the display device 1000.

An AV input unit 1600 receives audio signals or video signals and may include a camera 1610 and a microphone 1620. The camera 1610 may acquire still images or video frames of a moving picture through an image sensor in a video call mode or a photograph mode. The images captured through the image sensor may be processed by the processor 1300 or a separate image processor.

The video frames processed by the camera 1610 may be stored in the memory 1700 or transmitted externally through the communicator 1500. The camera 1610 may be provided in plural depending on the implementations.

The microphone 1620 captures external sounds and transforms the sound into electric sound signals. For example, the microphone 1620 may receive voices from an external device or a caller. The microphone 1620 may utilize various noise reduction algorithms to reduce noise introduced during the input of the external sounds.

Figure 3:
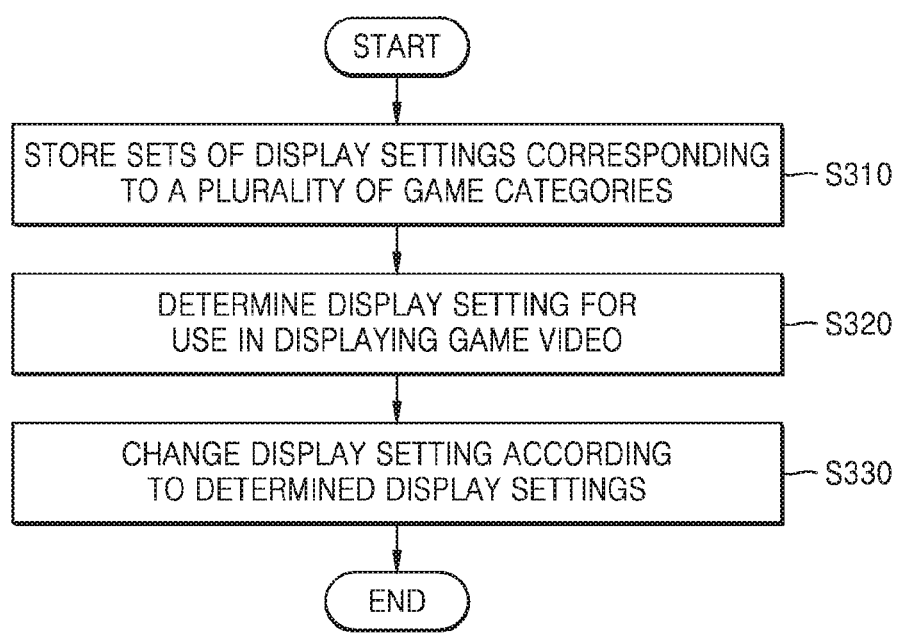
FIG. 3 is a flowchart illustrating a method of changing a display setting of a display device according to an exemplary embodiment.

FIG. 3 is a flowchart illustrating a method of changing a display setting of the display device 1000, according to an exemplary embodiment.

In operation S310, the display device 1000 may store sets of display settings corresponding to a plurality of game categories. The display settings preferred by the user may differ depending on the game categories. For example, the user often prefers a relatively bright screen when playing an RPG game, but often prefers a relatively dark screen when playing an RTS game. Also, the display settings may include brightness, response time, and refresh rate, but are not limited thereto. In order to provide an optimum display environment to the user who may execute a plurality of games, the display device 1000 may store a separate display setting for each game category. The display device 1000 may receive the display settings corresponding to each of the game categories from the external device or the server or acquire the display settings based on the user input.

According to an exemplary embodiment, the display device 1000 may match identification information of the display setting corresponding with each game category to an identifier of a button and store the matching information so that the display settings corresponding to each of a plurality of game categories match with respective buttons. For example, the display device 1000 may match at least one display setting corresponding to a first game category to a first button based on the user input. Also, the display device 1000 may match at least one display setting corresponding to a second game category to a second button based on the user input.

According to an exemplary embodiment, the display device 1000 may match the display settings corresponding to each game category to one of a plurality of button input methods. For example, the display device 1000 may store the display setting corresponding to a first game category as the display setting matching with a first button input method while storing the display setting corresponding to a second game category as the display setting matching with a second button input method. The button input methods may include at least one of: time during which the user presses the button, time interval between plural button inputs, and the number of button-pressings.

According to an exemplary embodiment, the display device 1000 may match the display settings corresponding to each game category to a combination of the pressed button and the button input method. For example, the display device 1000 may store the display setting corresponding to a first game category as the display setting matching with a first button input method through a first button. Also, display device 1000 may store the display setting corresponding to a second game category as the display setting matching with a second button input method through the first button.

According to an exemplary embodiment, when there is a button input from a certain button, the display device 1000 may store current display setting as the display setting matched with the button. The method of the button input may include, for example, touching and holding the button and double tapping the button.

According to an exemplary embodiment, the display device 1000 may display the second GUI for storing and editing the display settings. The user may input through a certain button and/or the display setting corresponding to the certain button. The display device 1000 may display the second GUI if there is a user input or if a prescribed event occurs even when there is no user input. The prescribed event may include, for example, a reset of the display device 1000, turning-on the display device 1000, execution of a game in an external device connected with the display device 1000, and installation of a game in the external device connected with the display device 1000. The external device may execute the game and provide the display device 1000 with video data of the currently running game. Also, when a game is executed or installed in the external device, the external device may provide the display device 1000 with identification information of the game executed or installed in the device.

According to an embodiment, the display device 1000 may display the display settings history. Using the display settings history, the user may easily match a certain button with the display setting which are used frequently when the user plays a game of a certain category. The display device 1000 may display the display settings history on a separate GUI, on some area of the second GUI, or as a sub-menu of the second GUI. The display settings history may include the display settings used recently or frequently when the user or other users play the game of the certain category. In case the display device 1000 is not an exclusive personal device, this function may bring an effect of recommending the display settings preferred by other users while playing a game belonging to the game category.

In operation S320, the display device 1000 may determine the display setting to be used for displaying video data of the game.

According to an exemplary embodiment, when there is a certain user input through the user input unit 1100, the display device 1000 may determine the display setting corresponding to the user input as the display setting to be used for displaying the current video data. The user input may include a button input.

According to an exemplary embodiment, when there is a user input through the first button, the display device 1000 may determine the display setting matched with the first button as the display setting to be used for displaying the current video data. When there is the user input through the second button, the display device 1000 may determine the display setting matched with the second button as the display setting to be used for displaying the current video data.

According to an exemplary embodiment, when there is the first button input method, the display device 1000 may determine the display setting matched with the first button input method as the display setting to be used for displaying the current video data. When there is the user input through the second button input method, the display device 1000 may determine the display setting matched with the second button input method as the display setting to be used for displaying the current video data.

According to an embodiment, the display device 1000 may determine the category of the currently running game to determine the display setting corresponding to the determined game category as the display setting to be used for displaying the current video data.

The display device 1000 may identify the currently running game by using a game list stored in the memory 1700. The display device 1000 may determine the category of the currently running game by searching for the game that matches with the currently running game in the game list.

The display device 1000 may search for the category of the currently running game in the game list by using game identifiers such as the name, icon, and character image of the currently running game. The display device 1000 may determine the display setting to be used to display current video data by the display setting corresponding to the determined game category among the settings stored in the memory 1700.

According to an embodiment, the display device 1000 may display a GUI that enables the user to select a method of determining the display setting. Methods of determining the display setting may include the determination according to the user input through the user input unit 1100, and automatic determination by identifying the category of the game currently running based on the game list even when there is no user input.

In operation S330, the display device 1000 may change the display setting of the display device 1000 based on the determined display setting.

According to an embodiment, the display device 1000 may output the first GUI showing the display setting. The first GUI may include the display setting currently set in the display device 1000. The display setting may include at least one of: black equalizer, response time, refresh rate, free sync, and input lag.

The black equalizer refers to an image processing technology that brightens dark scenes or areas without distorting bright areas while the display device 1000 displays the video data. The response time represents a speed of which the display device 1000 responds to a control command of the external device. The refresh rate refers to a frequency that the display device 1000 outputs the video data received from the external device or the server through the display. The free sync refers to a software technology that changes the refresh rate of the display device 1000 in synchronization with a rendering frequency of a graphics card. The input lag refers to a delay between the receipt of a video signal in the display device 1000 and the display of the video signal on the display. The user may check the current display setting at once through the first GUI without navigating hierarchical sub-menus of several depths. Also, the user may change the current display setting through the first GUI without navigating the hierarchical sub-menus of several depths.

Figure 4:
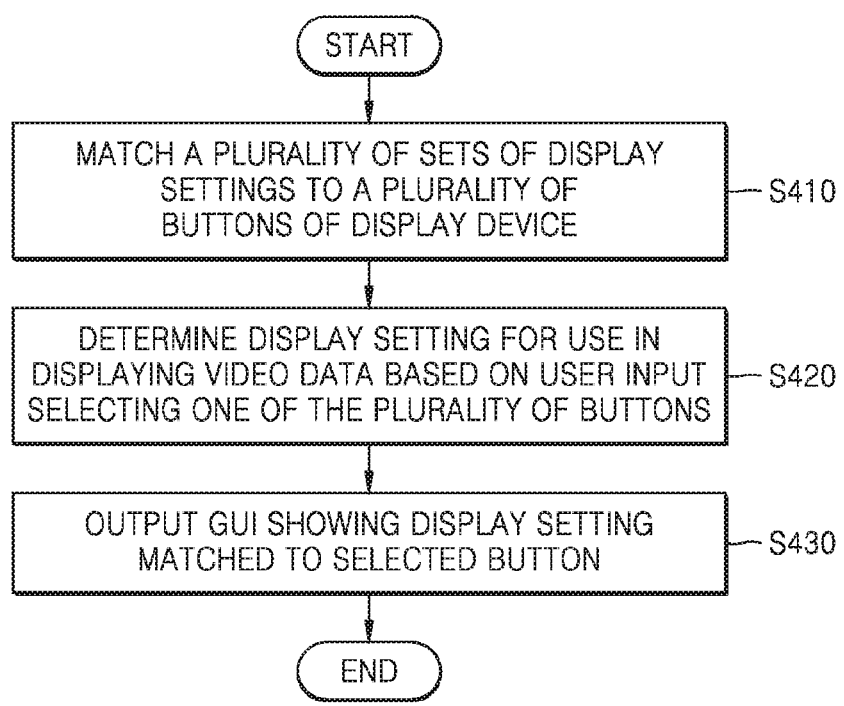
FIG. 4 is a flowchart illustrating a method of changing a display setting of the display device in response to a user input according to an exemplary embodiment.

FIG. 4 is a flowchart illustrating a method of changing a display setting of the display device 1000 in response to a user input according to an exemplary embodiment.

In operation S410, the display device 1000 may store sets of display settings in a state in which each of the display settings is matched to one of a plurality of buttons.

According to an exemplary embodiment, the display device 1000 may store the display setting optimized for an RPG game as the display setting corresponding to the first button. The display device 1000 may store the display setting optimized for an RTS game as the display setting corresponding to the second button. The display device 1000 may store the display setting optimized for an FPS game as the display setting corresponding to the third button.

According to an aspect of the exemplary embodiments, the display device 1000 may store the display settings optimized for each game in a state in which each of the display settings are matched to one of the plurality of buttons corresponding to the game category. For example, the display device 1000 may store the display setting optimized for a first game as the display setting corresponding to the first button. The display device 1000 may store the display setting optimized for a second game as the display setting corresponding to the second button.

In operation S420, the display device 1000 may determine the display setting to be used for displaying current video data based on the user input of selecting one of the plurality of buttons.

When there is the user input through the first button, the display device 1000 may determine the display setting corresponding to the first button as the display setting to be used for displaying the current video data. When there is the user input through the second button, the display device 1000 may determine the display setting corresponding to the second button as the display setting to be used for displaying the current video data.

The display device 1000 may output the first GUI showing display setting matched to the button selected by the user input. The first GUI may be used to display the display setting matched to the selected button. The display setting may include at least one of: black equalizer, response time, refresh rate, free sync, and input lag. The user may check the display setting matched to the button selected by the user input at once through the first GUI without navigating the hierarchical sub-menus of several depths.

According to an embodiment, the display device 1000 may output the first GUI on an area of the display. The area on which the first GUI is output may be chosen such that the first GUI is unlikely to occlude the output of the video data of the currently running game. The First GUI enables the user to check the current display setting with little occlusion of the video of the currently running game.

Figure 5:
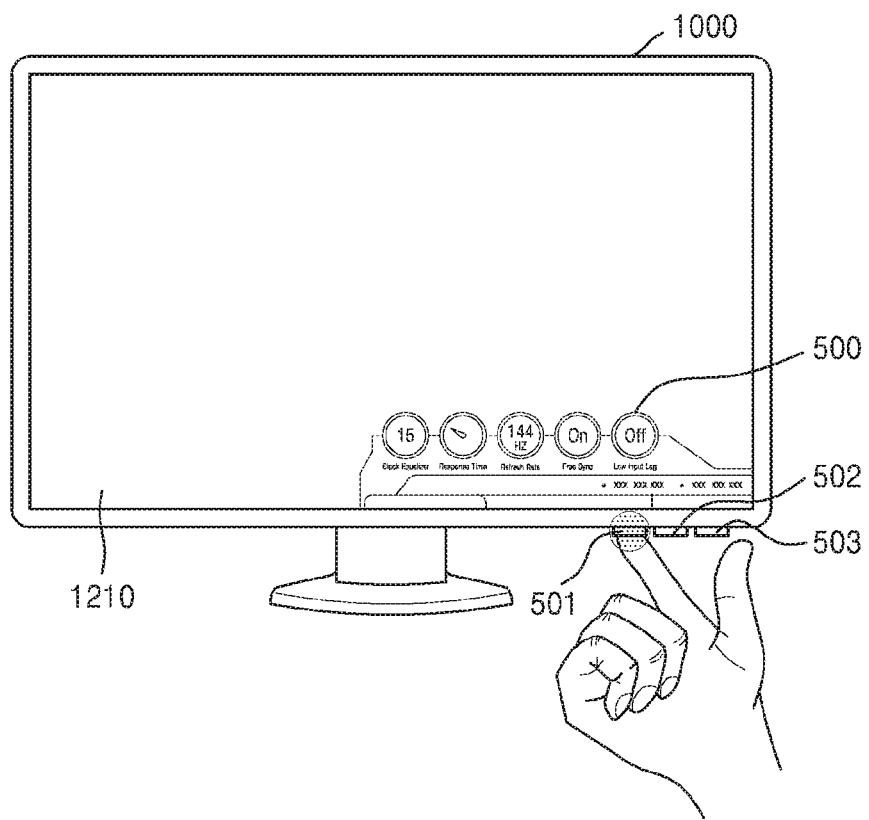
FIG. 5 illustrates a method of displaying a GUI showing a current display setting in response to a user input on the display device according to an exemplary embodiment.

FIG. 5 illustrates a method of displaying a GUI showing current display setting in response to the user input on the display device 1000, according to an exemplary embodiment.

Referring to FIG. 5, the user input unit 1100 of the display device 1000 may include buttons, for example, first, second, and third buttons 501, 502, and 503. When the user enters a user input of pressing the first button 501 among the first, second, and third buttons 501-503, the display device 1000 may determine the display setting corresponding to the first button 501 as the display setting to be used for outputting current video data. When there is the user input of pressing the first button 501 among the first, second, and third buttons 501-503, the display device 1000 may display a first GUI 500 showing the display setting corresponding to the first button 501 on the display 1210. The user may check the display setting that are currently being used and correspond to the first button 501.

The display device 1000 may output the first GUI 500 on a certain area of the display 1210. Referring to FIG. 5, the display device 1000 may output the first GUI 500 in a bottom right corner of the display 1210. However, the area on which the first GUI 500 is output in the display 1210 in FIG. 5 is just an example, and is not limited thereto. The display device 1000 may output the first GUI 500 on a certain area of the display 1210 which is likely to minimize the disturbance to the game operation of the user. The certain area of the display 1210 may include at least one of: a bottom left corner, the bottom right corner, a left side, a right side, a top left corner, and a top right corner.

Figure 6:
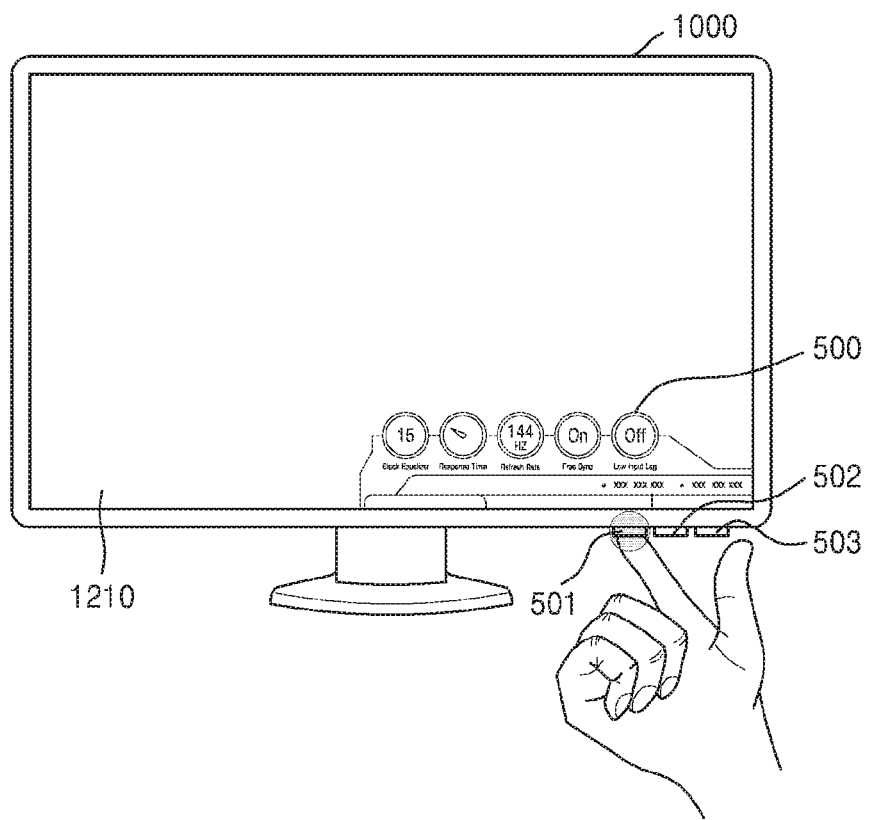
FIG. 6 illustrates a method of saving a display setting by using a matched button of the display device according to an exemplary embodiment.

FIG. 6 illustrates a method of saving a display setting by using a matched button of the display device 1000 according to an exemplary embodiment.

Referring to FIG. 6, the user input unit 1100 of the display device 1000 may include buttons, for example, first, second, and third buttons 501, 502, and 503. When the user enters a user input of pressing the first button 501 in a prescribed manner, the display device 1000 may store the display setting currently being used as the display setting that match or correspond to the first button 501. Examples of the prescribed manner of pressing the button may include pressing and holding the button, and shortly pressing the button a plurality of times, but is not limited thereto.

According to an exemplary embodiment, when there is the user input of pressing the first button 501 in the prescribed manner, the display device 1000 may store the display setting currently being used as the display setting matching the first button 501, and simultaneously display the display setting currently being used on the first GUI 500 that is outputting on the certain area of the display 1210. Thus, the user may easily save the current display setting as the display setting corresponding to one of the buttons just by pressing the button in the prescribed manner. Also, the user may check the current display setting of the display device 1000 through the first GUI 500.

Figure 7:
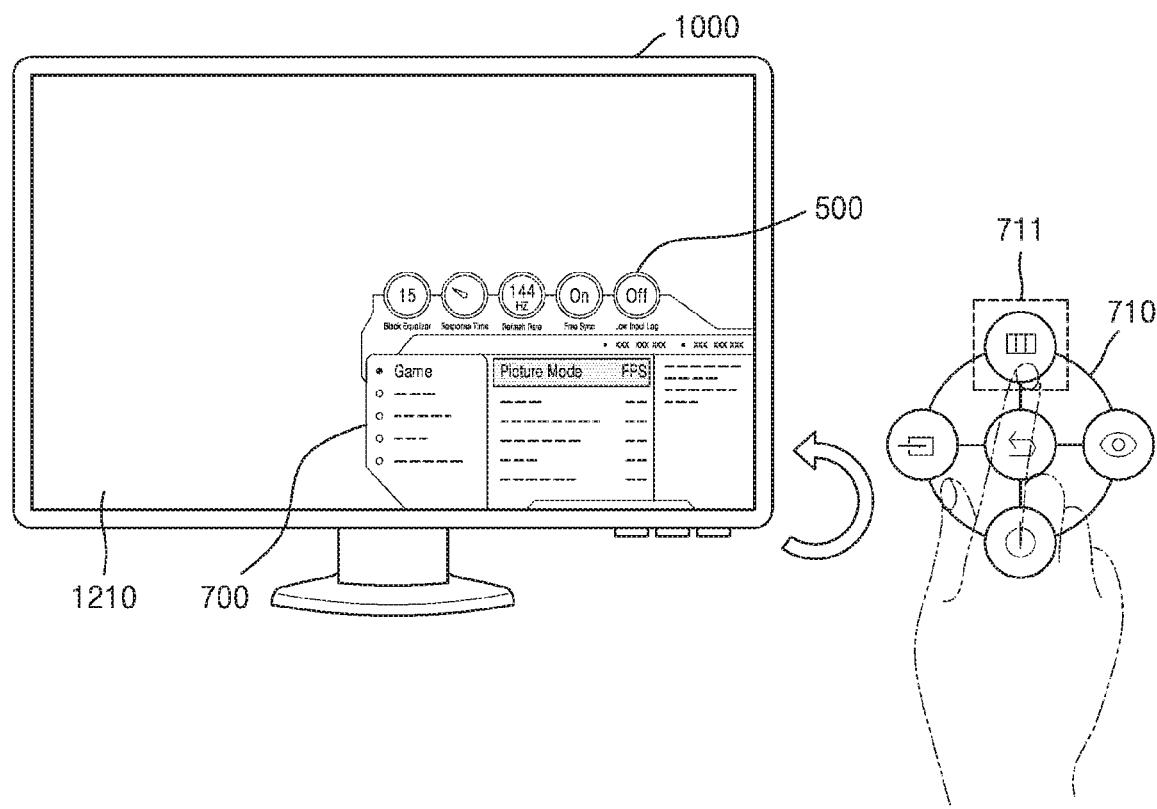
FIG. 7 illustrates a method of displaying a GUI that facilitates saving of the display setting in response to a user input on the display device according to an exemplary embodiment.

FIG. 7 illustrates a method of displaying a GUI that facilitates saving of the display settings in response to a user input on the display device 1000, according to an exemplary embodiment.

Referring to FIG. 7, the display device 1000 may include a jog key 710. The jog key 710 may be implemented by physical buttons or on a touch panel that may receive touch inputs. When there is a user input of pressing a menu button 711 in the jog key 710, the display device 1000 may output a second GUI 700 that allows the user to change the display settings. When there is the user input using the menu button 711, the display device 1000 may output the first GUI 500 along with the second GUI 700. The first GUI 500 may show the current display setting. The second GUI 700 may include a menu for saving the display settings matched to one of the plurality of buttons 501-503. The user may invoke the second GUI 700 that facilitates the change of the display setting through the input using the menu button 711 without navigating the hierarchical sub-menus of several depths. The user may save the display setting matched to one of the first, second, and third buttons 501-503 without navigating the hierarchical sub-menus of several depths.

Figure 8:
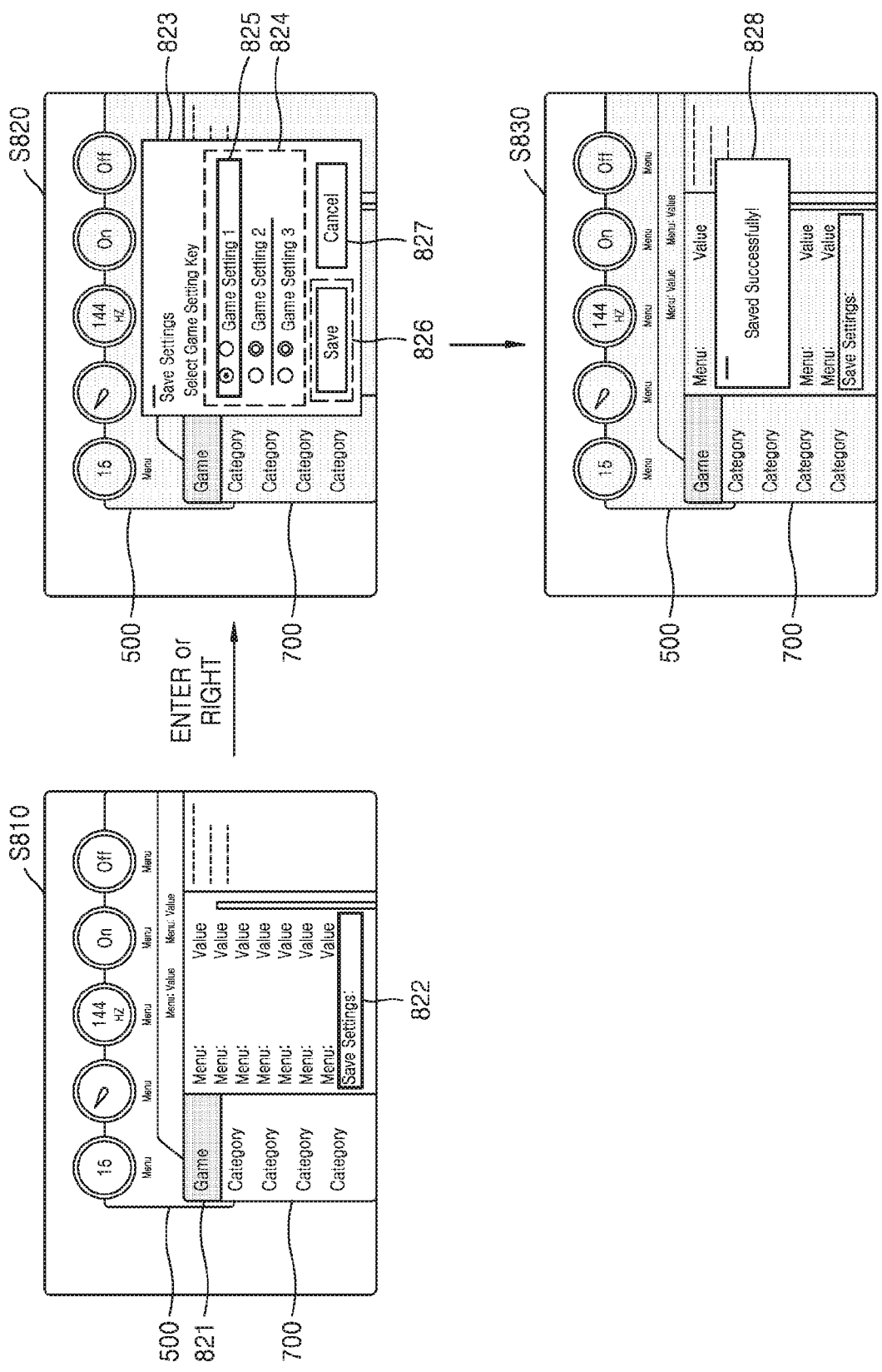
FIG. 8 illustrates a method of saving a display setting by using a matched button of the display device according to another exemplary embodiment.

FIG. 8 illustrates a method of saving a display setting by using a matched button of the display device 1000, according to another embodiment.

Referring to FIG. 8, the display device 1000 may output the second GUI 700 that facilitates saving of the display settings corresponding to one of a plurality of game categories by using respective one of a plurality of buttons. The display device 1000 may output the first GUI 500 along with the second GUI 700. The first GUI 500 initially output by the display device 1000 may show the current display setting. The user change the display setting to be used for outputting video data by changing each display setting item in the first GUI 500. The display device 1000 may store the display setting shown in the first GUI 500 as the display setting matched, through a menu in the second GUI 700, to a certain button of the display device 1000.

For example, the user may save the display setting shown in the first GUI 500 as the display setting matched to the certain button by selecting 'game' item 821, which is a menu in the second GUI 700, and then selecting 'Save Settings:' item 822, which is a sub-menu under the menu 'game' 821 (Operation S810). Selection of menus and sub-menus in the second GUI 700 may be carried out, for example, by clicking a mouse, pressing an ENTER key on a keyboard, or pressing a right arrow key on the keyboard.

When there is a user input selecting the 'Save Settings:' item 822, the display device 1000 may output a third GUI 823 allowing the user to select a button to be matched to the display setting (Operation S820). The third GUI 823 may include a menu 824 for selecting one of the plurality of buttons, a 'Save' icon 826 for matching the display setting and a selected button and storing the display setting, and a 'Cancel' icon 827 for cancelling the matching and storing operations. When there are user inputs of selecting 'Game Setting 1' item 825 and selecting the 'Save' icon 826, the display device 1000 may store the display setting as the values corresponding to the first button 501.

When there are user inputs of selecting one of the plurality of buttons and selecting the 'Save' icon 826, the display device 1000 may display a notification message 828 informing the user that the display setting shown in the first GUI 500 are stored as the display setting corresponding to the selected button (Operation S830).

The user may change the display setting or save the display setting corresponding to each button through the first GUI 500 and the second GUI 700 without navigating the hierarchical sub-menus of several depths.

Figure 9:
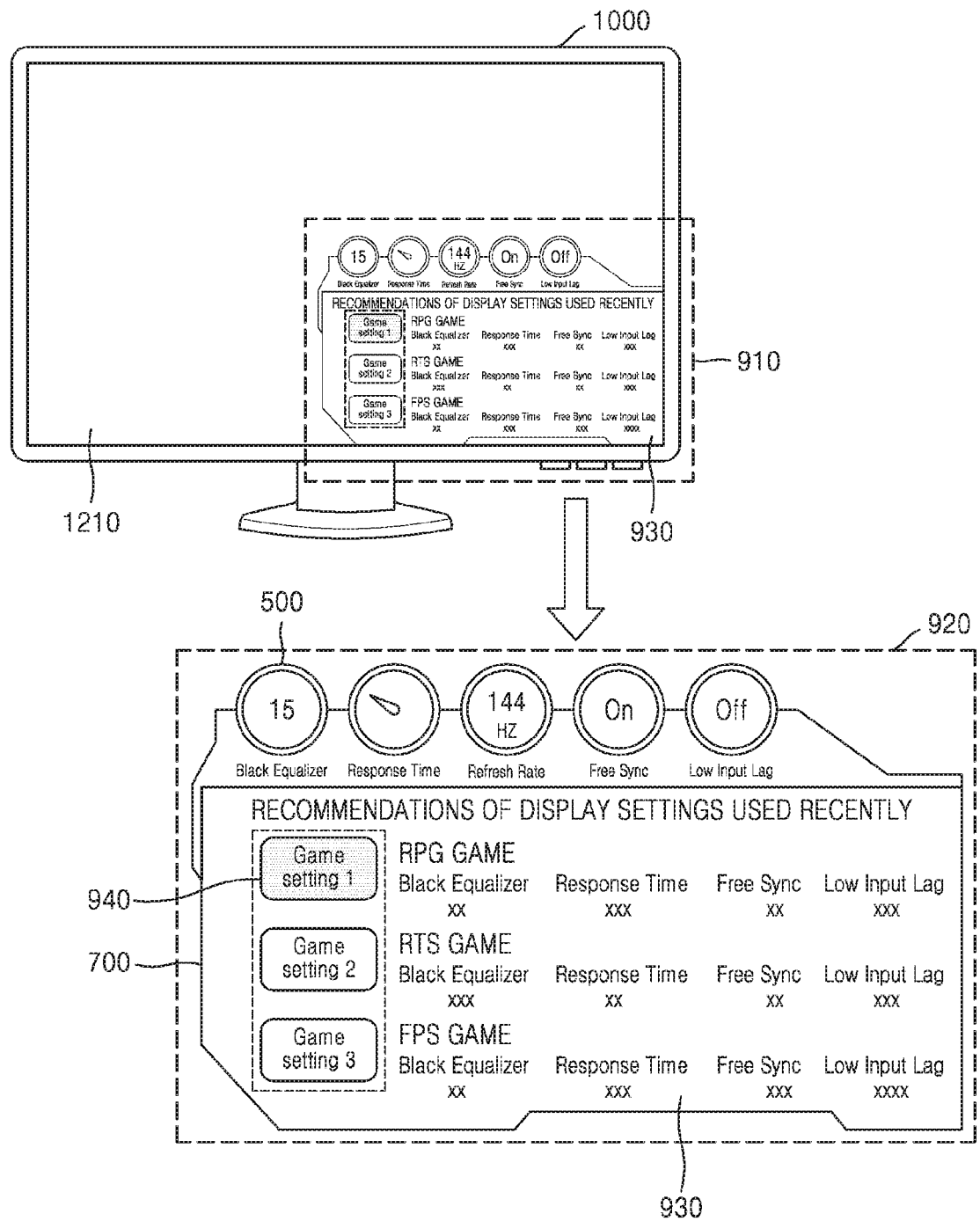
FIG. 9 illustrates a method of recommending display settings based on a history of the display settings used in the display device according to an exemplary embodiment.
Figure 10:
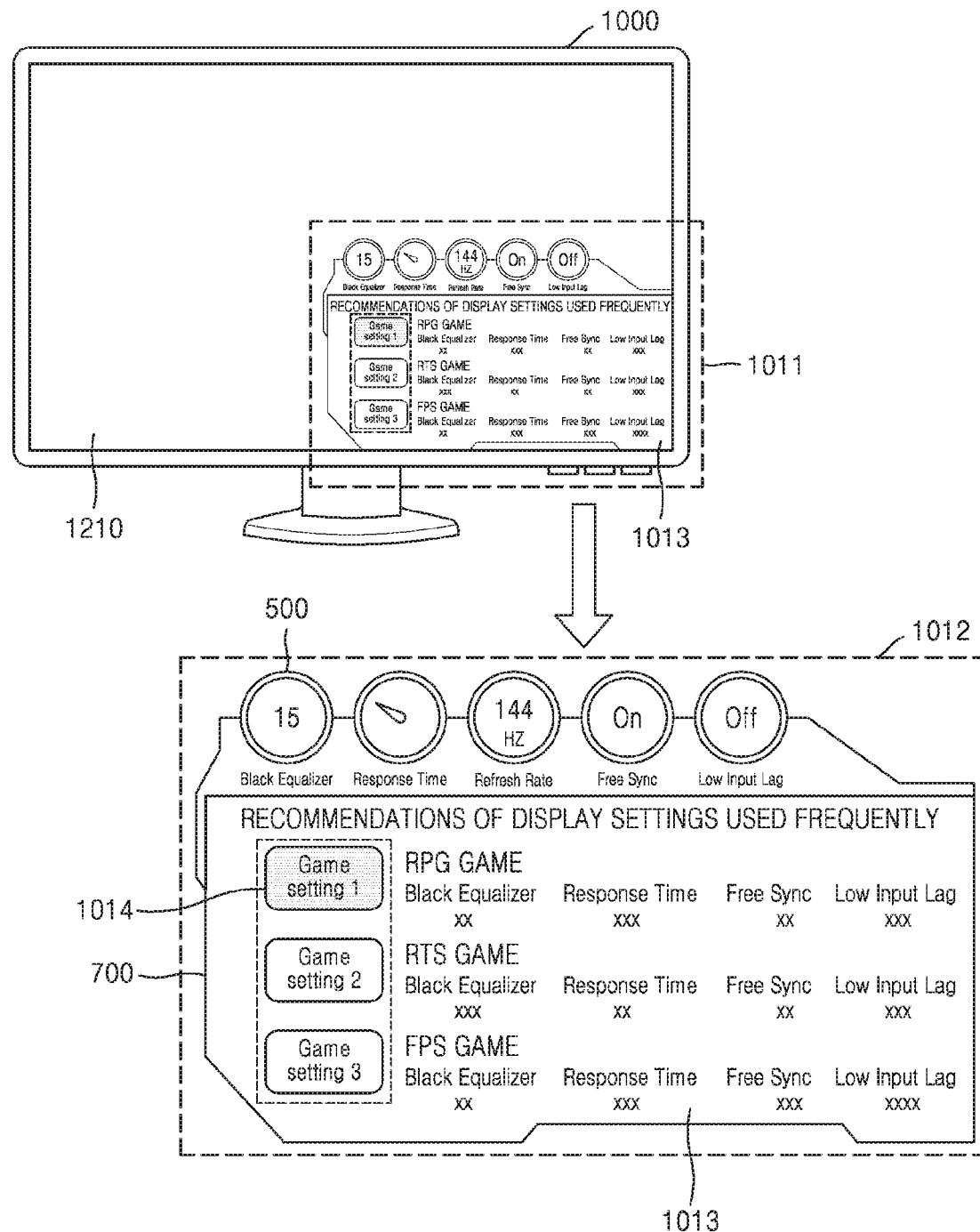
FIG. 10 illustrates a method of recommending display settings based on the history of the display settings used in the display device according to another exemplary embodiment.

FIGS. 9 and 10 illustrate methods that the display device 1000 recommends display settings based on histories of the display settings used in the display device 1000.

Referring to FIG. 9, the display device 1000 may output the first GUI 500 and the second GUI 700 in a certain area on the display 1210. Reference numeral 920 shown in FIG. 9 represents an enlarged illustration for an area 910 displayed in some portion of the display 1210. The display device 1000 may display a 'RECOMMENDATIONS OF DISPLAY SETTINGS USED RECENTLY' item 930 in a certain area of the second GUI 700. The 'RECOMMENDATIONS OF DISPLAY SETTINGS USED RECENTLY' item 930 may include the display settings that have been used recently by the user for each game category. The user may save the display settings corresponding to the plurality of buttons 501-503 through the 'RECOMMENDATIONS OF DISPLAY SETTINGS USED RECENTLY' item 930.

For example, when there is the user input of selecting a 'Game setting 1' item 940, the display device 1000 may store the display setting used recently for a RPG game among the display settings included in the 'RECOMMENDATIONS OF DISPLAY SETTINGS USED RECENTLY' item 930 as the display setting corresponding to the first button 501.

Referring to FIG. 10, the display device 1000 may output the first GUI 500 and the second GUI 700 in a certain area on the display 1210. Reference numeral 1012 shown in FIG. 10 represents an enlarged illustration for an area 1011 displayed in some portion of the display 1210. The display device 1000 may display a 'RECOMMENDATIONS OF DISPLAY SETTINGS USED FREQUENTLY' item 1013 in a certain area of the second GUI 700. The 'RECOMMENDATIONS OF DISPLAY SETTINGS USED FREQUENTLY' item 1013 may include the display settings that have been used frequently by the user for each game category. The user may save the display settings corresponding to the plurality of buttons 501-503 through the 'RECOMMENDATIONS OF DISPLAY SETTINGS USED FREQUENTLY' item 1013.

For example, when there is the user input of selecting the 'Game setting 1' item 1014, the display device 1000 may store the display setting used frequently for the RPG game among the display settings included in the 'RECOMMENDATIONS OF DISPLAY SETTINGS USED FREQUENTLY' item 1013 as the display setting corresponding to the first button 501.

The user may easily save the display settings corresponding to each button input by using the recommendations of the display device 1000 that are based on the display setting history. In case the display device 1000 is not an exclusive personal device, the recommendation function may bring an effect of recommending the display settings preferred by other users while playing a game belonging to the game category.

Figure 11:
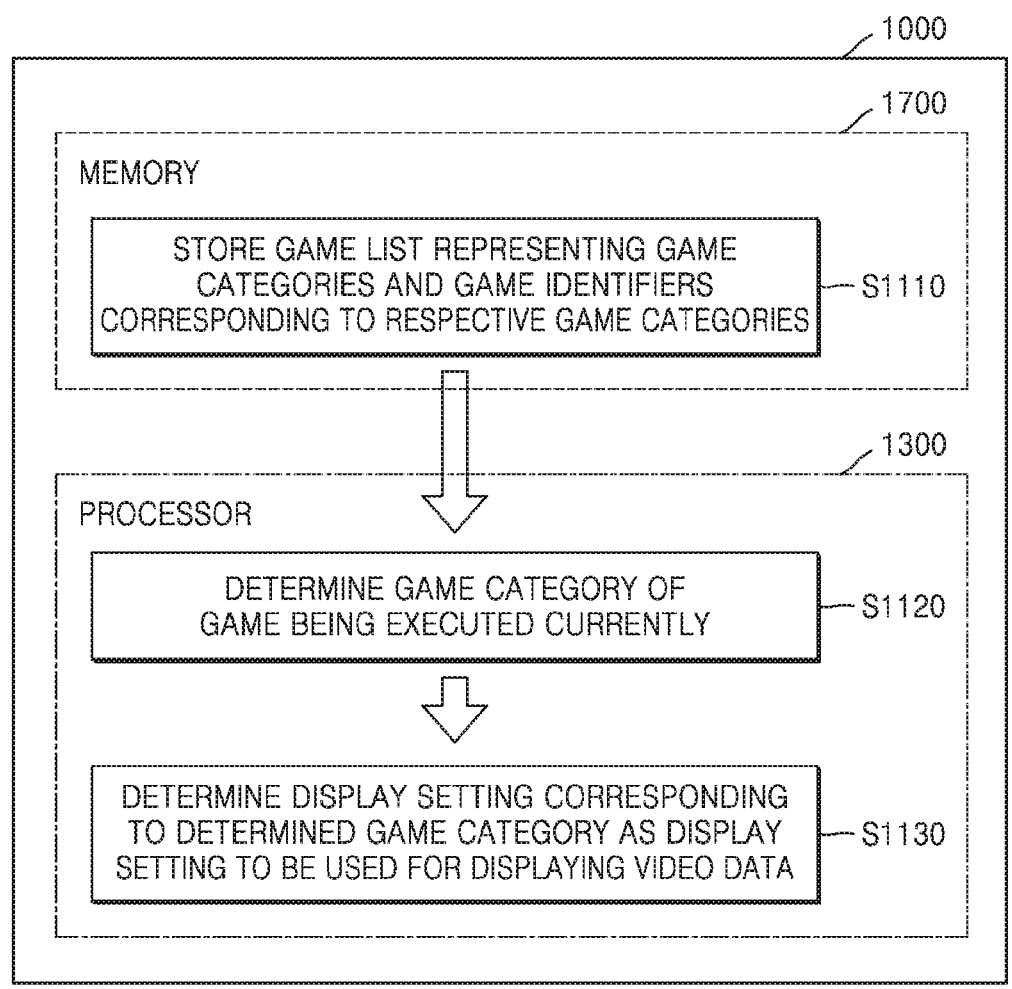
FIG. 11 is a flowchart illustrating a method of changing a display setting, in which the display device determines a category of a currently executed game and changes the display setting based on a determined game category according to an exemplary embodiment.

FIG. 11 is a flowchart illustrating a method of changing a display setting where the display device 1000 determines the category of the currently running game and changes the display setting according to a determined game category according to an exemplary embodiment.

In operation S1110, the display device 1000 may store a game list representing game categories and game identifiers corresponding to respective game categories.

According to an exemplary embodiment, the display device 1000 may store the game identifiers such as the name, icon, and image of each of the games into the game list in a state that the game is classified into one of the game categories such as the RPG, FTS, and FPS.

According to an exemplary embodiment, the display device 1000 may update the game list according to a certain period or a user input. Updating of the game list may be carried out by changing the game list according to a user input, receiving a updated game list from the server, or receiving the game identifies of a new game from an external device to store in the display device 1000 when the external device executes the new game.

In operation S1120, the display device 1000 may determine, based on the game list, the category of the currently running game. For example, the display device 1000 may detect a game identifier included in the video of the currently running game, and search a game identifier corresponding to the detected the game identifier among the game identifiers stored in the game list. Based on the search result, the display device 1000 may identify the game category corresponding to the game identifier detected from the video of the currently running game. The display device 1000 may determine the category of the currently running game to be the identified game category.

In operation S1130, the display device 1000 may determine the display setting corresponding to the determined game category as the display setting to be used for displaying video data.

According to an exemplary embodiment, the display device 1000 may determine the display setting to be used for displaying current video data based on the display setting stored in the memory 1700 that are matched to the game categories. For example, in case that the category of the currently running game is determined to be the FPS, the display device 1000 may determine the display setting stored in the memory 1700 that are matched to the FPS game as the display setting to be used for displaying the current video data. The display device 1000 may change the display setting to be used for displaying current video data based on the determined display setting. The display device 1000 may automatically change the display setting into the settings optimized for the currently running game, even when there is no user input, based on the game list.

Figure 12:
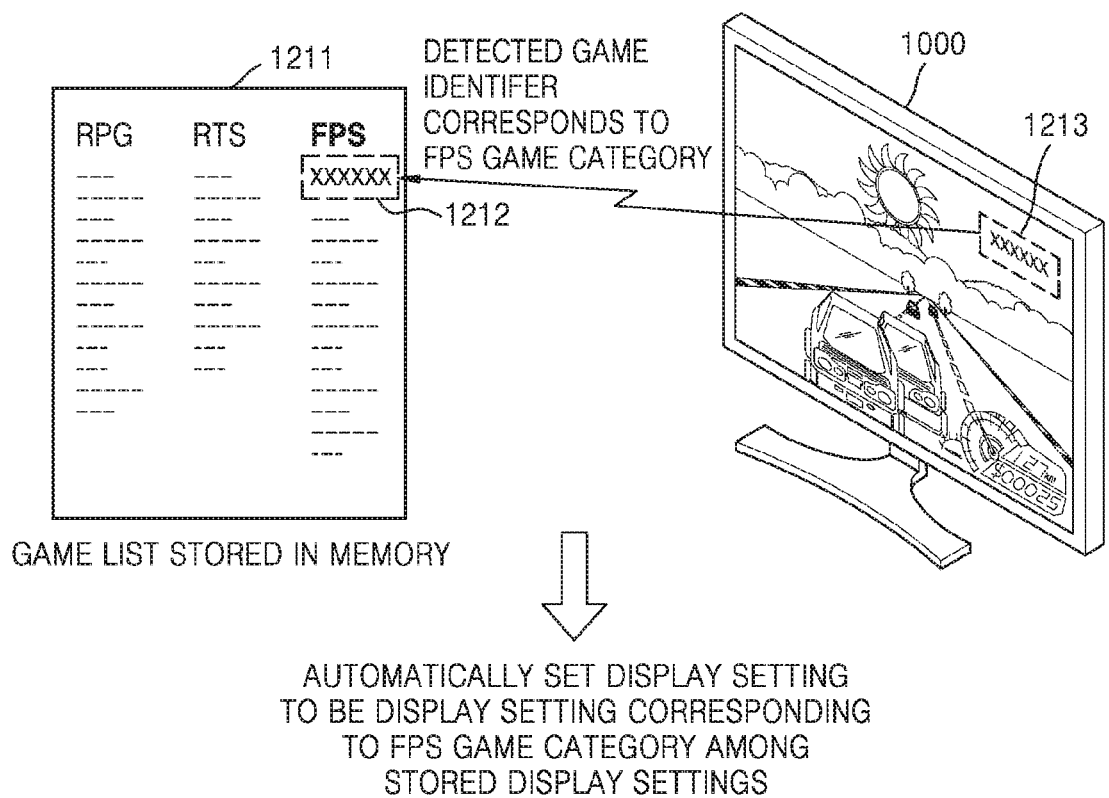
FIG. 12 is a flowchart illustrating a method of changing a display setting, in which the display device determines the category of the currently executed game and changes the display setting based on the determined game category according to another exemplary embodiment.

FIG. 12 is a flowchart illustrating a method of changing display setting where the display device 1000 determines the category of the currently running game and changes the display setting according to the determined game category according to another exemplary embodiment.

Referring to FIG. 12, the display device 1000 may include a game list 1211 stored in the memory 1700. The display device 1000 may search a game identifier included in the video of the currently running game from the game list 1211. For example, when the game identifier included in the video of the currently running game is 'xxxxxx' 1213, the display device 1000 may search for the game identifier 'xxxxxx' from the game list 1211. If the game identifier 'xxxxxx' 1213 matches an item 'xxxxxx' 1212 included in a record of the FPS in the game list 1211, the display device 1000 may determine the category of the currently running game as the FPS.

The display device 1000 may determine the display setting to be used for displaying video data of the currently running game on the basis of the determined game category. For example, when the determined game category is the FPS, the display device 1000 may determine the display setting stored in a state of matching to the FPS game category as the display setting to be used for displaying video data of the currently running game. The display device 1000 may change the display setting based on the determined display setting.

As described above, the present exemplary embodiments enable to effectively determine and change the display setting to be used for displaying video data of a currently running game by storing display settings corresponding to a plurality of game categories.

In more detail, according to an embodiment, each of the optimum display settings corresponding to a plurality of game categories are stored in the memory and are matched with respective one of a plurality of buttons, so that the user may change the display setting just by a button input. Even when there is no user input, the display setting optimized to the currently running game may be determined based on a game list stored in the display device and actual display setting may be changed into the determined display setting, which may enhance the concentration into the game and gaming efficiency of the user.

While not limited thereto, the exemplary embodiments described above may be written into a computer-readable program, stored in a non-transitory computer-readable storage medium, and implemented in a general-purpose digital computer executing the program by use of the non-transitory computer-readable storage medium.

Data structure used in this disclosure may be stored in a non-transitory computer-readable storage medium through various means. Also, the exemplary embodiments described above may be implemented as computer instructions which can be executed by various computer means, and recorded on a non-transitory computer-readable medium. For example, the methods implemented as a software module or algorithms may be stored into a non-transitory computer-readable medium as computer-readable codes or program instructions.

The non-transitory computer-readable medium may be an arbitrary recording medium accessible by a computer, and may include volatile or nonvolatile media, and removable or non-removable media. The computer-readable medium may include magnetic media such as a hard disk, a floppy disk, and a magnetic tape; optical media such as a compact disk-read only memory (CD-ROM) and a digital versatile disc (DVD); magneto-optical media such as a floptical disk; a read-only memory (ROM); a random access memory (RAM); and a flash memory, but is not limited thereto. The medium may be a transmission medium, such as an optical or metal line, a waveguide, or carrier waves transferring program commands, data structures, and the like.

Also, the computer-readable medium may include a plurality of media that are distributed over computer systems and connected by a network. The distributed data such as program instructions and codes may be executed by at least one computer.

Specific executions described above regarding the exemplary embodiments are presented for exemplary purposes and not intended to limit the scope of the disclosure. For simplicity, descriptions of general-purpose circuits, control systems, software, and other functional aspects are omitted.

Elements or devices described in terms of a singular or localized form may be implemented in a distributed manner. Also, an element, system or device described in terms of a distributed form may be implemented in a combined or singular form.

All the examples and the exemplary terminologies (e.g., "such as" and "and so on") are used simply for exemplify the present exemplary embodiments and not intended to limit the scope of the disclosure.

Unless there is an explicit limitation such as "essential" and "importantly," the elements described in this disclosure may not be essential to the implementation of the present exemplary embodiments.

Terminologies such as "~ unit" and "~ module" refer to entities performing at least one function or operation, and may be implemented by hardware, software, or combination thereof. The "~ unit" and "~ module" may be configured to be included in an addressable storage medium or to reproduce one or more processors. For example, the term "~ unit" and "~ module" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables.

The expression "A may include one among A1, A2, and A3" should be understood in a broad sense that the exemplary element that may be included in the component A is A1, A2, or A3. The expression is not intended to mean that the element that may constitute the component A is limited to A1, A2, or A3. Thus, the expression should not be construed exclusively in a sense that unexemplified elements other than A1, A2, and A3 are precluded.

Also, the above expression means that the element A may include A1, that the component A may include A2, or that the component A may include A3. Further, the above expression does not mean that an element that may constitute the component A is necessarily to be determined selectively from a set containing the elements A1, A2, and A3. For example, it should be noted that the above expression is not construed in a limited sense that only A1, A2, or A3 selected from a set containing the elements A1, A2, and A3 constitutes the component A.

The expression "at least one of: A1, A2, and A3" in this disclosure represents one among the elements or combinations of the elements "A1", "A2", "A3", "A1 and A2", "A1 and A3", "A2 and A3", and "A1, A2 and A3".

Thus, the expression "at least one of: A1, A2, and A3" should not be construed as "at least one of A1," "at least one of A2," and "at least one of A3" unless the expression definitely describes "at least of A1, at least one of A2, and at least one of A3."

It should be understood that exemplary embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of changing a display setting in a display device, comprising:
    detecting, by a processor of the display device, a game identifier, that identifies a particular video game, included in video data of the particular video game that is currently running;
    searching, by the processor, a game identifier matched with the detected game identifier in a game list, pre-stored in a memory of the display device, that includes game identifiers identifying different respective video games;
    automatically identifying, by the processor, a display setting corresponding to the searched game identifier in the game list; and
    changing, by the processor, an actual display setting of the display device according to the identified display setting,
    wherein the identifying the display setting comprises:
        identifying a display setting that other users different from a user of the display device have used for the particular video game that is currently running, and
    wherein the method further comprises:
        receiving, from at least one of an external device or a server connected to the display device, the identified display setting that other users have used; and
        displaying the received display setting.

2. The method of claim 1, further comprising:
    determining, by the processor, at least one game for the display setting;
    classifying, by the processor, the identifier including at least one of a name, an icon, and an image of the determined at least one game; and
    storing, by the processor, the classified identifier and the at least one game, in the game list.

3. The method of claim 1, further comprising:
    determining, by the processor, at least one game for pre-determining a display setting based on a user input for selecting the at least one game; and
    storing, by the processor, a plurality of display settings corresponding to at least one game identifier of the determined at least one game.

4. The method of claim 1, wherein the changing the actual display setting comprises:
    in response to receiving a user input for selecting the displayed setting, changing, by the processor, the actual display setting of the display device according to the received display setting that the other users have used.

5. The method of claim 1, further comprising:
    storing, by the processor, display settings history representing display settings having been utilized in the memory;
    recommending, by the processor, at least one display setting for the particular video game that is currently running based on the display settings history; and
    identifying, by the processor, the display setting based on a user input for selecting one of the recommended at least one display setting.

6. The method of claim 3, further comprising:
    based on a user input for selecting one of a plurality of buttons of the display device in a predetermined manner, matching, by the processor, one of the plurality of display settings to the selected button;

in response to receiving the user input for selecting one of the plurality of buttons, changing the actual display setting according to the display setting matched to the selected button; and in response to receiving the user input for selecting one of the plurality of buttons in the predetermined manner, displaying the display setting matched to the selected button on the display device.

7. The method of claim 6, wherein the predetermined manner comprises at least one of a manner of pressing and holding the selected button or a manner of pressing the selected button a plurality of times.

8. The method of claim 3, further comprising:
based on a user input for selecting a first button of a plurality of buttons of the display device in a predetermined manner, matching, by the processor, one of the plurality of display settings to the first button; and
in response to receiving the user input for selecting the first button, displaying, by the processor, a first graphical user interface (GUI) representing a display setting matched with the first button.

9. The method of claim 8, further comprising:
displaying, by the processor, a second GUI for allowing the user to edit the display setting matched with the first button on the first GUI; and
in response to receiving a user input for selecting at least one menu displayed on the second GUI, by the processor, displaying a third GUI including a sub-menu for matching the plurality of display settings to the plurality of buttons of the display device.

10. The method of claim 1, wherein the game list is updated based on at least one of a user input or a game list newly received from a server according to a predetermined period.

11. A display device, comprising:
a display;
a memory configured to store instructions; and
a processor configured to execute the instructions to:
detect a game identifier, that identifies a particular video game, included in video data of the particular video game that is currently running;
search a game identifier matched with the detected game identifier in a game list, pre-stored in the memory, that includes game identifiers identifying different respective video games;
identify, automatically, a display setting corresponding to the searched game identifier in the game list; and
change an actual display setting of the display device according to the identified display setting,
wherein the processor is further configured to:
identify a display setting that other users different from a user of the display device have used for the particular video game that is currently running, and
receive, from at least one of an external device or a server connected to the display device, the identified display setting that other users have used; and
control the display to display the received display setting.

12. The display device of claim 11, wherein the processor is further configured to:
determine at least one game for the display setting;
control the memory to classify the identifier including at least one of a name, an icon and an image of the determined at least one game; and
control the memory to store the classified game identifier and the at least one game in the game list.

13. The display device of claim 11, wherein the processor is further configured to:
determine at least one game for pre-determining display setting based on a user input for selecting the at least one game; and
control the memory to store a plurality of display settings corresponding to at least one game identifier of the determined at least one game.

14. The display device of claim 11, wherein the processor is further configured to:
in response to receiving a user input for selecting the displayed setting, change the actual display setting of the display device according to the received display setting that other users have used.

15. The display device of claim 11, wherein the processor is further configured to:
control the memory to store display settings history representing display settings having been utilized in the memory;
recommend at least one display setting for the particular video game that is currently running based on the display settings history; and
identify the display setting based on a user input for selecting one of the recommended at least one display setting.

16. The display device of claim 13, wherein the processor is further configured to:
based on a user input for selecting one of a plurality of buttons of the display device in a predetermined manner, match one of the plurality of display settings to the selected button;
in response to receiving the user input for selecting one of the plurality of buttons, change the actual display setting according to the display setting matched to the selected button; and
in response to receiving the user input for selecting one of the plurality of buttons in the predetermined manner, control the display to display the display setting matched to the selected button.

17. The display device of claim 16, wherein the predetermined manner comprises at least one of a manner of pressing and holding the selected button or a manner of pressing the selected button a plurality of times.

18. The display device of claim 13, wherein the processor is further configured to:
based on a user input for selecting a first button of a plurality of buttons of the display device in a predetermined manner, match one of the plurality of display settings to the first button; and
in response to receiving the user input for selecting the first button, control the display to display a first graphical user interface (GUI) representing a display setting matched with the first button.

19. The display device of claim 18, wherein the processor is further configured to:
control the display to display a second GUI for allowing the user to edit the display setting matched with the first button on the first GUI; and
in response to receiving a user input for selecting at least one menu displayed on the second GUI, control the display to display a third GUI including a sub-menu for matching the plurality of display settings to the plurality of buttons of the display device.

20. The display device of claim 11, wherein the game list is updated based on at least one of a user input or a game list newly received from a server according to a predetermined period.

* * * * *